United States Patent
Kwon

(12) 
(10) Patent No.: US 6,473,455 B1
(45) Date of Patent: Oct. 29, 2002

(54) METHOD FOR COMPENSATING A PHASE DELAY OF A CLOCK SIGNAL

(75) Inventor: Ki Paek Kwon, Seoul (KR)

(73) Assignee: Daewoo Electronics Co., Ltd., Seoul (KR)

( * ) Notice: Subject to any disclaimer, the term of this patent is extended or adjusted under 35 U.S.C. 154(b) by 0 days.

(21) Appl. No.: 09/425,044

(22) Filed: Oct. 22, 1999

(30) Foreign Application Priority Data

Nov. 19, 1998 (KR) .............................. 98-49728

(51) Int. Cl.⁷ .............................................. H04Q 01/20
(52) U.S. Cl. ...................... 375/228; 375/362; 375/373; 327/276
(58) Field of Search ................................ 375/228, 293, 375/354, 362, 373, 376; 327/113, 114, 144, 149, 152, 153, 161, 162, 276, 296, 277, 284, 294

(56) References Cited

U.S. PATENT DOCUMENTS

| 5,247,485 A | | 9/1993 | Ide | |
|---|---|---|---|---|
| 5,430,394 A | * | 7/1995 | McMinn et al. | 324/527 |
| 5,878,055 A | * | 3/1999 | Allen | 714/744 |
| 6,084,933 A | * | 7/2000 | Kubinec | 327/113 |
| 6,154,079 A | * | 11/2000 | Lee et al. | 327/276 |

FOREIGN PATENT DOCUMENTS

WO 9849802 11/1998

* cited by examiner

Primary Examiner—Chi Pham
Assistant Examiner—Khanh Cong Tran
(74) Attorney, Agent, or Firm—Pennie & Edmonds LLP

(57) ABSTRACT

A method compensates a phase delay of a clock signal used in a data communications system. First, a plurality of delayed clock signals are provided by modifying the amount of delay of the clock signal. In synchronization with one of the delayed clock signals, one or more test data signals and their address signals are sequentially issued and sent to a storage device. In synchronization with the original clock signal, each test data signal is stored in an area that its address signal indicates and then, upon receipt of the address signal at a predetermined time of the original clock signal, a data signal which corresponds to the address signal is read and sent to a controller. At a predetermined time of the delayed clock signal, a data signal is received from the storage device and it is checked whether or not each test data signal and the received data signal are the same. If it is checked to be positive, the process is repeated for a next test data signal and, if otherwise, the process is repeated for a next delayed clock signal until it becomes checked to be positive. Finally, if it is checked to be positive with respect to all the one or more test data signals, the delayed clock signal is decided as a definitive clock signal to be used in the semiconductor device, and if not, the process is repeated for a next delayed clock signal until it becomes checked to be positive.

6 Claims, 4 Drawing Sheets

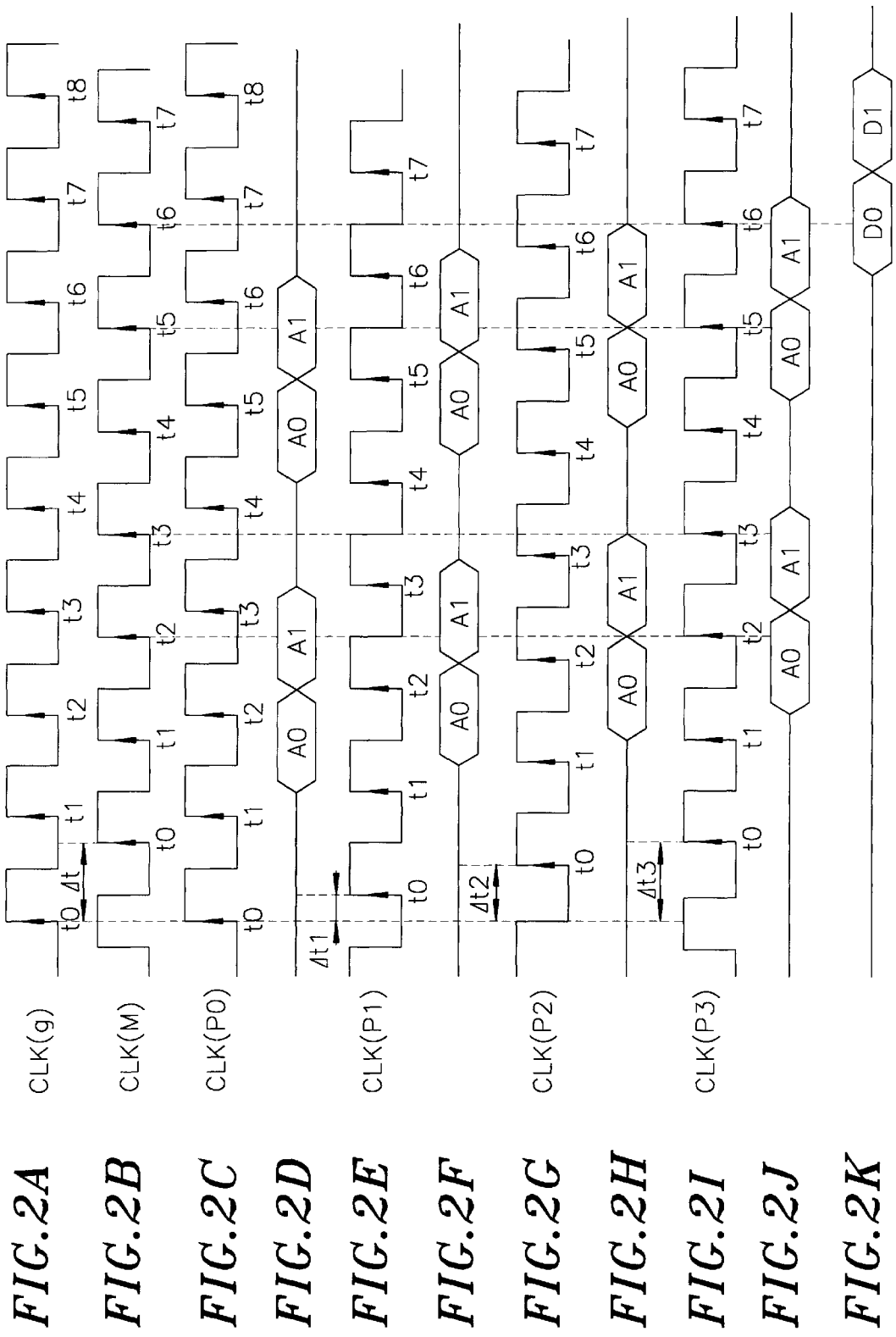

METHOD FOR COMPENSATING A PHASE DELAY OF A CLOCK SIGNAL

FIELD OF THE INVENTION

The present invention relates to a data communications system; and, more particularly, to a method for effectively compensating a phase delay of a clock signal used in the data communications system.

BACKGROUND OF THE INVENTION

In a data communications system having a microprocessor or an application specific integrated circuit (ASIC), there is normally employed an external memory for temporarily storing various information and operating or processing data of the system. When a semiconductor device such as processor(s) or device(s) in the system requests the external memory to retrieve any data stored therein, the external memory reads and transfers the data to the requesting device.

To synchronously read and transfer the data, generally, there is utilized a clock signal with a certain clock rate in the data communications system. Specifically, the clock signal is generated by a clock generator in the system and supplied to the semiconductor device requesting the retrieval of the data as well as the external memory via a bus so that they can be operated in synchronization with the clock signal.

Due to the usage of the bus between the semiconductor device and the external device and other factors in the data communications system, however, there necessarily exists a certain amount of delay in the clock signal to the external memory, resulting in a phase discrepancy in the clock signal supplied to each of the semiconductor device and the external memory. Such discrepancy may cause the retrieval of undesired data from the external memory, thereby lowering the reliability of the data communications system. Prior to storing data in the external memory, therefore, a simple clock test procedure has been carried out after initialization thereof.

To help understand the prior art clock test procedure, there is presented an ideal instance wherein clock signals to the semiconductor device and the external memory are synchronized. Details of a clock test procedure in the ideal instance will now be described with reference to FIGS. 3A to 3C. For simplicity, only one clock signal, CLK(C, M), is illustrated in FIG. 3A since no phase difference exists between the clock signals. It should be noted that the clock signal CLK(C, M) is not drawn in an actual scale.

First of all, the clock signal CLK(C, M) is applied to each of the semiconductor device and the external memory. When the clock signal CLK(C, M) is received by the semiconductor device, a controller, which is associated with the device and monitors the operation thereof, sequentially issues and transfers one or more test data signals and their corresponding address signals to the external memory via a bus in accordance with the clock signal CLK(C, M). The number of the test data signals can be determined based on the capacity of the external memory. For simplicity, in FIG. 3B, there are illustrated only two address signals A0 and A1, although their corresponding two test data signals D0 and D1 are not shown.

Specifically, at a rising edge t1 of the clock signal CLK(C, M), the controller produces and sends the test data signal D0 and the corresponding address signal A0 to the external memory via the bus. Meanwhile, the external memory, at a rising edge t2 of the clock signal CLK(C, M), receives and stores the test data signal D0 in an area that is indicated by the signal A0. And then, at a rising edge t4 of the clock signal CLK(C, M) after three cycles from the issuing of the test data signal D0 and the address signal A0 at the time t1, the controller again provides the external memory with the address signal A0 together with a control signal (not shown) to retrieve its corresponding data signal, i.e., D0, stored thereon. The time duration between said t1 and t4 can be decided on the basis of the performance and capacity of the data communications system and the external memory. In response to the address signal A0 and the control signal, the external memory, at a rising edge t5 of the clock signal CLK(C, M), reads and transfers the corresponding data signal D0 to the controller via the bus.

Thereafter, the controller, at a predetermined time, receives a data signal from the external memory and checks whether the test data signal D0 and the received data signal are the same. That is, at a rising edge t6 of the clock signal CLK(C, M) after two cycles from the issuing of the address signal A0 and the control signal at the time t4, the controller receives a data signal through the bus from the external memory and checks whether or not the test data signal D0 and the received data signal are the same. In this ideal instance, as can be seen from FIGS. 3A and 3C, it will be checked to be positive since both data signals are the same at the time t6. Regarding the test data signal D1 following the test data signal D0, the clock test procedure will be performed in the same manner. As can be inferred from the above test, since it will be checked to be positive with respect to all the test data signals, the controller finally determines the clock signal as a definitive one to be used in the semiconductor device and the external memory. However, if it is checked to be negative with respect to any of the test data signals during the clock test procedure, a conventional phase delay compensation procedure is carried out, as will be described below.

Turning now to FIGS. 4A to 4D, there are depicted timing diagrams for explaining the prior art clock test method. First, it is assumed that a clock signal CLK(C) as shown in FIG. 4A is applied to the semiconductor device, while a clock signal CLK(M) of FIG. 4C is inputted to the external memory. From FIG. 4C, it will be seen that there exists a phase delay of At in the clock signal CLK(M) compared to the clock signal CLK(C) for the reasons mentioned above.

The prior art clock test method is carried out in a same manner as in the ideal instance except that there are employed the two clock signals with a phase difference of At therebetween. In synchronization with the clock signal CLK (C) of FIG. 4A, first, the controller sequentially issues and sends one or more test data signals and their corresponding address signals to the external memory via the bus. For brevity, in FIG. 4B, there are illustrated only two address signals A0 and A1; but their corresponding two test data signals D0 and D1 are not shown.

Specifically, at a rising edge t1 of the clock signal CLK(C), the controller produces and sends the test data signal D0 and the corresponding address signal A0 to the external memory via the bus. Meantime, at a rising edge m1 of the clock signal CLK(M), the external memory receives and stores the test data signal D0 at an area to which the signal A0 corresponds. And then, at a rising edge t4 of the clock signal CLK(C) after three cycles from the issuing of the test data D0 and the address signal A0 at the time t1, the controller again produces and sends the address signal A0 together with a control signal(not shown) to the memory to retrieve its corresponding data signal, i.e., D0, stored thereon. In response to the signal A0 and the control signal, the memory, at a rising edge m4 of the clock signal CLK(M), reads and transfers the corresponding data signal D0 to the controller via the bus.

Thereafter, the controller, at a predetermined time, receives a data signal from the memory and checks as to whether the test data signal D0 and the received data signal are same. In other words, at a rising edge t6 of the clock signal CLK(C) after two cycles from the issuing of the address signal A0 and the control signal at the time t4, the controller receives a data signal from the external memory and checks whether or not the test data signal D0 and the received data signal are the same. In this case, as can be seen from FIGS. 4A and 4D, it will be checked to be negative since the data signal D0 transferred from the external memory is received by the controller at a rising edge t5 of the clock signal CLK(C). Regarding the test data signal D1 following the test data signal D0, the clock test procedure will be performed in the same manner. Through the above test, if it is checked to be positive with respect to all the test data signals, the controller finally determines the clock signal as a definitive one to be used in the semiconductor device and the external memory; however, if otherwise, i.e., if it is checked to be negative with respect to any of the test data, a conventional delay compensation technique is carried out in the following manner.

Normally, the amount of delay of the clock signal in the data communications system increases as the length of the bus lengthens. Based on this premise, the conventional delay compensation technique adjusts the length of the bus in accordance with the result from the clock test, thereby compensating the phase delay of the clock signal to the external memory. This technique, however, has a shortcoming in that it is incapable of adaptively arranging circuitry elements at their required positions within the semiconductor device.

SUMMARY OF THE INVENTION

It is, therefore, a primary object of the present invention to provide a method capable of improving the performance and reliability of a data communications system employing an effective phase delay compensation technique.

In accordance with the present invention, there is provided a method, for use in a data communications system having a semiconductor device and a storage device coupled thereto via a bus, for compensating a phase delay of a clock signal coupled to the devices, the method comprising the steps of:

(a) providing a plurality of delayed clock signals with different delay amounts by modifying the amounts of delay of the clock signal;

(b) in synchronization with a delayed clock signal selected among the delayed clock signals, sequentially issuing and sending, at a controller, one or more test data signals and address signals thereof to the storage device via the bus;

(c) in synchronization with the original clock signal, at the storage device, storing each of the one or more test data signals in an area that its address signal indicates and, thereafter, upon receipt of the address signal at a predetermined time of the original clock signal, reading and sending a data signal which corresponds to the address signal to the controller via the bus;

(d) at a predetermined time of the delayed clock signal, receiving, at the controller, a data signal from the storage device and checking as to whether or not said each test data signal and the received data signal are the same;

(e) if it is checked to be positive with respect to said each test data signal at said step (d), repeating said steps (b) to (d) for a next test data signal and, if otherwise, repeating said steps (b) to (d) for a next selected delayed clock signal until it becomes checked to be positive; and (f) if it is checked to be positive with respect to all the one or more test data signals at said step (e), determining the delayed clock signal as a definitive clock signal to be used in the semiconductor device, and, if otherwise, repeating the steps (b) to (e) for a next selected delayed clock signal until it becomes checked to be positive.

BRIEF DESCRIPTION OF THE DRAWINGS

The above and other objects and features of the present invention will become apparent from the following description of preferred embodiments given in conjunction with the accompanying drawings, in which:

FIGS. 2A to 2K depict timing diagrams for explaining the novel delay compensation method in accordance with the invention;

DETAILED DESCRIPTION OF THE PREFERRED EMBODIMENTS

Figure 1:
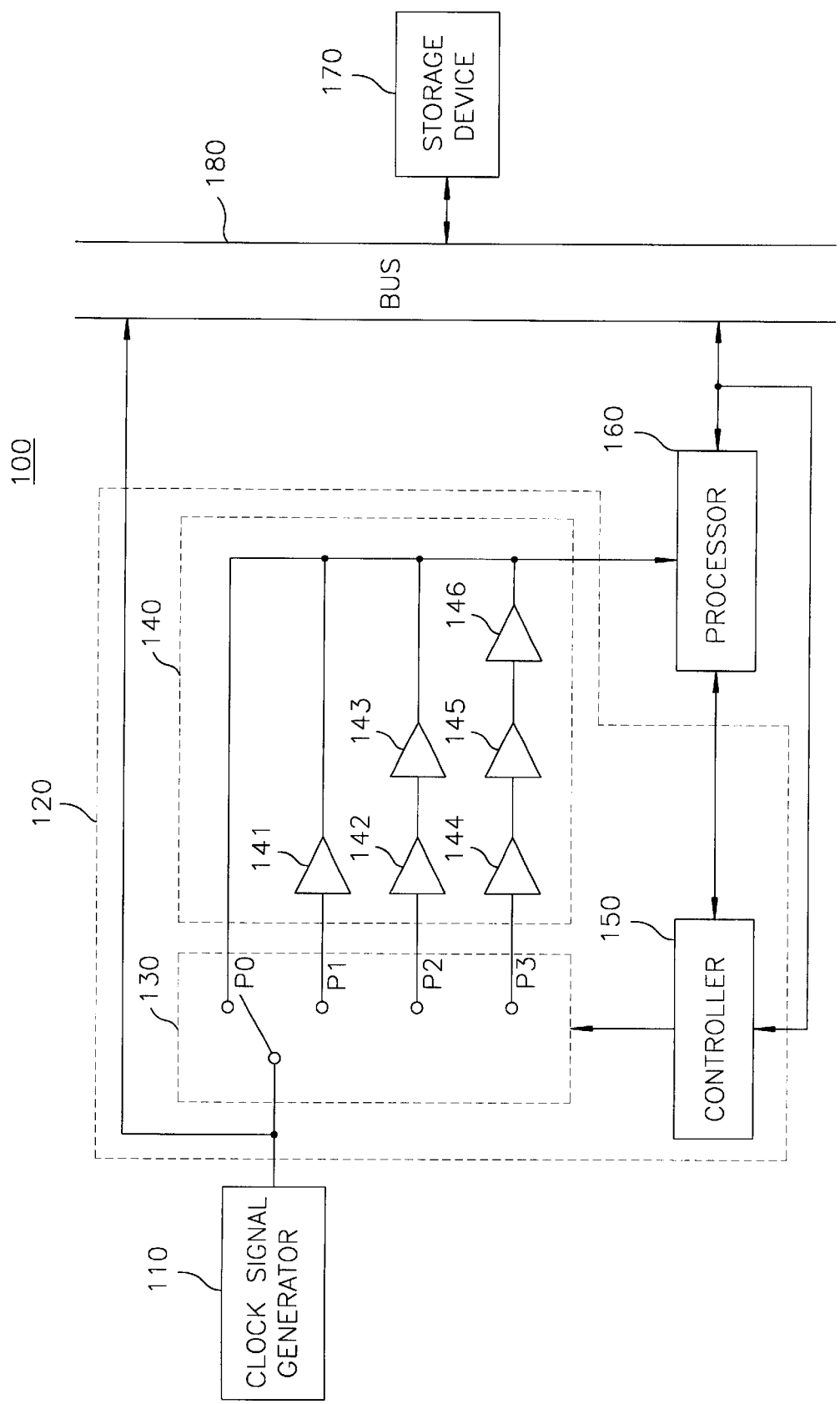
FIG. 1 is a block diagram of a data communications system in accordance with the present invention.
Figures 3A, 3B, 3C:
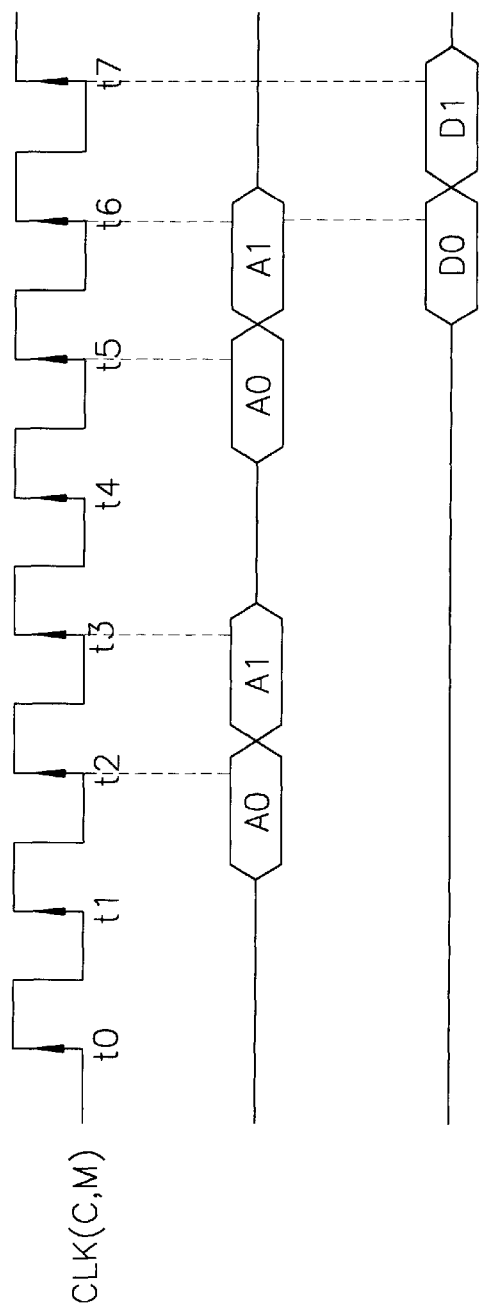
FIGS. 3A to 3C show timing diagrams for describing an ideal instance in which clock signals to the semiconductor device and the external memory as shown in FIG. 1 are synchronized.
Figures 4A, 4B, 4C, 4D:
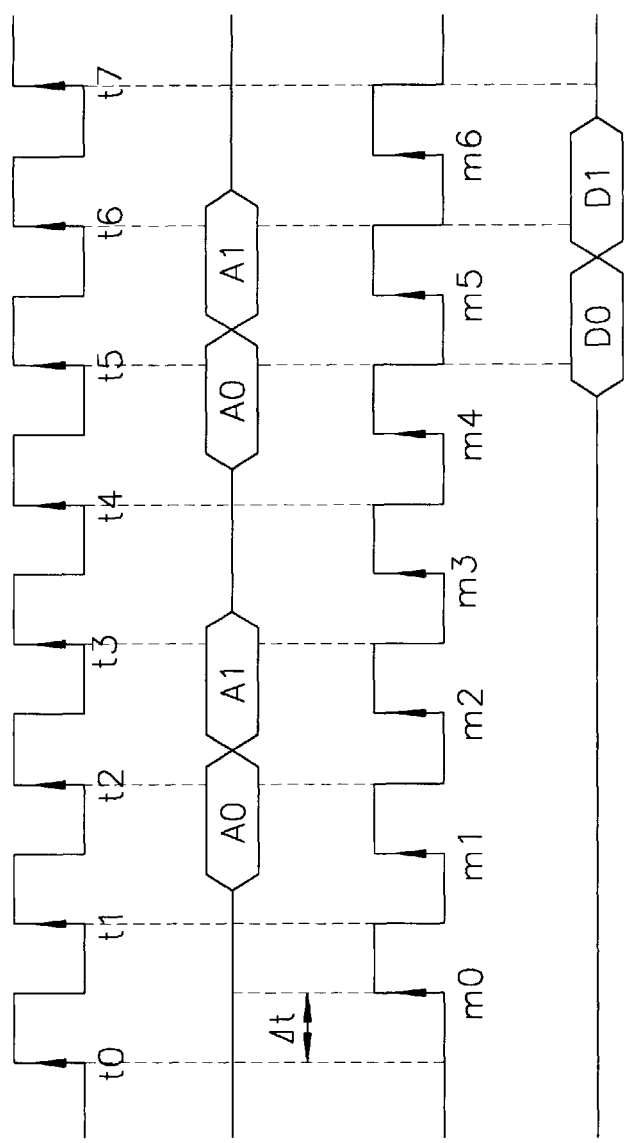
FIGS. 4A to 4D present timing diagrams for describing a prior art clock test method.

Referring to FIG. 1, there is provided a block diagram of a data communications system 100 incorporating therein a novel delay compensation device 120 in accordance with the present invention. Using a delay compensation technique of the invention, as will be described below, no phase difference exists between a clock signal applied to a semiconductor device, e.g., a processor 160 and a clock signal to a storage device 170. This can be accomplished by replacing the clock signal to the processor 160 with one of N delayed clock signals which matches with the clock signal to the storage device 170. As will be seen from the following description, the N delayed clock signals are obtained from N corresponding delay paths provided in a delay circuit 140 of the present invention. For simplicity, there are depicted only one processor 160 and one storage device 170 in the data communications system 100. As shown in FIG. 1, the inventive data communications system 100 comprises a clock signal generator 110, the delay compensation device 120, the processor 160 and the storage device 170.

Specifically, a clock signal CLK(g), as depicted in FIG. 2A, is produced from the clock signal generator 110 and supplied to the storage device 170 via the bus 180 and to the delay circuit 140 of the delay compensation device 120. It should be noted that the clock signal CLK(g), its delayed clock signals, CLK(P0)–CLK(P3), and a clock signal CLK (M), as shown in FIGS. 2A, 2C, 2E, 2G, 2I, 2B, are not drawn in actual scales.

As shown in FIG. 1, the delay circuit 140 includes N, e.g., four, delay paths P0–P3, each having a different amount of delay, wherein N is a positive integer. In accordance with the invention, one of the four delay paths, e.g., the first delay path P0 has no delay element, which will have a zero amount of delay, whereas the remainder thereof is comprised of one or more buffers with a different amount of delay. In other words, as shown in FIG. 1, the second delay path P1 consists of one buffer 141, the third delay path P2 consists of two buffers 142, 143, and the fourth delay path P3 consists of three buffers 144–146.

As mentioned above, the clock signal CLK(g) is also applied to the delay circuit 140 by activation of the switch 130. The switch 130 has one input terminal and N output terminals and is operated on the basis of a switch control signal from a controller 150 in the delay compensation device 120. It may be designed that, at an initial time, the switch control signal has a default value to choose one of the four delay paths, e.g., P0. As illustrated in FIGS. 2A and 2C, a phase of the clock signal CLK(P0) on the first delay path P0 accords with that of the clock signal CLK(g) since the amount of delay of the signal CLK(P0) is zero. Alternatively, it may be designed that the switch control signal has a value denoting a previously determined delay path. For illustration, in a preferred embodiment of the invention, it is assumed that, at the initial time, the switch control signal has the default value to choose the first delay path P0. From then on, it is also assumed that the switch control signal is determined under the control of the controller 150 which monitors data being communicated between the processor 160 and the storage device 170.

Even though the clock signal CLK(g) is supplied from the clock generator 110 to the storage device 170 via the bus 180, on the other hand, there necessarily exists a certain amount of delay in the clock signal CLK(g) because of the usage of the bus 180. For illustration, it is assumed that a clock signal CLK(M) with a phase delay of At compared to the clock signal CLK(g), as shown in FIG. 2B, is applied to the storage device 170.

Details of the delay compensation technique of the invention will be now provided with reference to FIGS. 1 and 2A–2K. To choose one of the clock signal CLK(P0) on the delay path P0 and its delayed clock signals CLK(P1)–CLK(P3) from the delay paths P1–P3, which matches with the signal CLK(M) to the storage device 170, as mentioned above; the clock signal CLK(P0) is first selected and applied to the processor 160. Upon receipt of the clock signal CLK(P0), the controller 150, which is associated with the processor 160 and monitors the operation thereof, sequentially produces and sends one or more test data signals and their corresponding address signals to the storage device 170 via the bus 180. The number of the test data signals can be determined based on the capacity of the storage device 170. For simplicity, in a preferred embodiment of the invention, it is assumed that there are used only two test data signals, D0, D1, and their corresponding two address signals, A0, A1.

Specifically, at a rising edge t1 of the clock signal CLK(P0), the controller 150 produces and transfers the test data signal D0 and the address signal A0 as depicted in FIG. 2D to the storage device 170 via the bus 180. Meantime, the storage device 170, in synchronization with the clock signal CLK(M), receives the test data signal D0 and the address signal A0. That is, at a rising edge t1 of the signal CLK(M), the device 170 receives the address signal A0 and the corresponding test data signal D0 and stores same in an area to which the address signal A0 corresponds. Thereafter, at a rising edge t4 of the clock signal CLK(P0) after three cycles from the issuing of the test data signal D0 and the address signal A0 at the time t1, the controller again produces and sends the address signal A0 together with a control signal (not shown) to the storage device 170 to read its corresponding data signal, i.e., D0, stored thereon. The time duration between said t1 and t4 can be decided on the basis of the performance and capacity of the data communications system 100 and the storage device 170. In response to the address signal A0 and the control signal, the storage device 170, at a rising edge t4 of the clock signal CLK(M), reads and transfers the corresponding data signal D0 to the controller 150 via the bus 180.

Thereafter, the controller 150, at a predetermined time, receives a data signal from the device 170 and checks as to whether the test data signal D0 and the received data are the same. In other words, at a rising edge t6 of the signal CLK(P0) after two cycles from the issuing of the address signal A0 and the control signal at the time t4, the controller 150 receives a data signal through the bus 180 from the device 170 and checks whether or not the test data signal D0 and the received data signal are the same. As can be inferred from FIGS. 2B–2D, it will be checked to be negative since the data signal D0 is received by the controller 150 at a rising edge t5 of the signal CLK(P0). In this case, in accordance with the invention, a further process is not performed with respect to the remaining test data signal, i.e., D1, since the test data signal D0 and the received data signal are different from each other. And then, the controller 150 automatically controls the switch 130 to couple the clock signal CLK(g) from the clock signal generator 110 to a next delay path, i.e., the second delay path P1 of the delay circuit 140.

Similarly, the delay compensation procedure under the clock signal CLK(P1) from the second delay path P1 is carried out in a same manner as in the first delay path P0. In short, at a rising edge t1 of the clock signal CLK(P1), the controller 150 produces and sends the test data signal D0 and the address signal A0 as depicted in FIG. 2F to the storage device 170. Meanwhile, the storage device 170, at a rising edge ti of the signal CLK(M), receives the test data signal Do and the address signal A0 and stores same in an area to which the address signal A0 corresponds. Thereafter, at a rising edge t4 of the clock signal CLK(P1), the controller again produces and sends the address signal A0 together with the control signal to the storage device 170 to read its corresponding data signal, i.e., D0, stored thereon. At a rising edge t4 of the clock signal CLK(M), the storage device 170, reads the corresponding data signal Do in response to the address signal A0 and the control signal and sends same via the bus 180 to the controller 150.

Thereafter, the controller 150, at the predetermined time, i.e., at a rising edge t6 of the signal CLK(P1), receives a data signal through the bus 180 from the device 170 and checks whether or not the test data signal D0 and the received data signal are the same. As may be inferred from FIGS. 2B, 2E, 2F, it will be checked to be negative since the data signal D0 is received by the controller 150 at a rising edge t5 of the signal CLK(P1). In this case, a further process is not also performed with respect to the remaining test data signal; and the controller 150 automatically controls the switch 130 to couple the clock signal CLK(g) from clock signal generator 110 to a next delay path, i.e., the third delay path P2. This process is sequentially repeated for a next delayed clock signal until each data from the storage device 170 becomes equal to each test data signal issued by the controller 150 at each predetermined time.

Through the repeated processes, if it is checked that data, which is provided through the bus 180 from the storage device 170, is equal to the test data signal Do issued under the clock signal CLK(P3) from the fourth delay path P3, the above process is repeated with respect to the following test data signal, D1, in the same manner as in the test data signal D0. From the above, with respect to all the test data signals, if it is checked that, at each predetermined time, each test data signal and each received data signal are the same, the controller 150 finally determines the clock signal CLK(P3) as a definitive one to be used in the processor 160 and controls the switch 130 to connect the clock signal CLK(g) to the third delay path (P3). As long as the processor 160 is operated, it is continued that the definitive clock signal CLK(P3) is connected to the processor 160 in order to synchronously perform a series of given processes therein, or operate with the storage device 170. However, if it is checked to be negative with respect to any of the test data signals, it will be continued to perform the above process for a next delay path which is not shown. Even though there is illustrated the controller 150 which is separated from the processor 160 herein for brevity, it should be appreciated that the controller 150 may be incorporated within the processor 160.

As a result, the present invention can compensate a phase delay of the clock signal to the storage device in the data communications system by employing the efficient delay compensation scheme using the repeated delay path selection algorithm, thereby improving the performance and reliability of the system.

While the present invention has been shown and described with respect to the particular embodiments, it will be apparent to those skilled in the art that many changes and modifications may be made without departing from the spirit and scope of the invention as defined in the appended claims.

What is claimed is:

1. A method, for use in a data communications system having a semiconductor device and a storage device coupled thereto via a bus, for compensating a phase delay of a clock signal coupled to the devices, the method comprising the steps of:

(a) providing a plurality of delayed clock signals with different delay amounts by modifying the amounts of delay of the clock signal;

(b) in synchronization with a delayed clock signal selected among the delayed clock signals, sequentially issuing and sending, at a controller, one or more test data signals and address signals thereof to the storage device via the bus;

(c) in synchronization with the original clock signal, at the storage device, storing each of the one or more test data signals in an area that its address signal indicates and, thereafter, upon receipt of the address signal at a predetermined time of the original clock signal, reading and sending a data signal which corresponds to the address signal to the controller via the bus;

(d) at a predetermined time of the delayed clock signal, receiving, at the controller, a data signal from the storage device and checking as to whether or not said each test data signal and the received data signal are the same;

(e) if it is checked to be positive with respect to said each test data signal at said step (d), repeating said steps (b) to (d) for a next test data signal and, if otherwise, repeating said steps (b) to (d) for a next selected delayed clock signal until it becomes checked to be positive; and (f) if it is checked to be positive with respect to all the one or more test data signals at said step (e), determining the delayed clock signal as a definitive clock signal to be used in the semiconductor device, and, if otherwise, repeating the steps (b) to (e) for a next selected delayed clock signal until it becomes checked to be positive.

2. The method of claim 1, wherein at said step (a) each of the delayed clock signals is obtained by sequentially increasing the amount of delay of the original clock signal by a preset amount.

3. The method of claim 1, wherein the step (a) is performed using a delay circuit with N delay paths connected in parallel, said N delay paths having a different amount of delay, respectively, wherein N is a positive integer.

4. The method of claim 3, wherein the step (a) includes step of selectively coupling the original clock signal to one of said N delay paths in response to a switch control signal issued at the controller, to thereby provide a corresponding one of the delayed clock signals.

5. The method of claim 3, wherein one of said N delay paths has no delay element and the remainder thereof is comprised of one or more delay elements.

6. The method of claim 5, wherein each of said one or more delay elements is a buffer.

* * * * *